US008433548B2

(12) United States Patent
Merlhiot

(10) Patent No.: US 8,433,548 B2
(45) Date of Patent: Apr. 30, 2013

(54) METHOD AND DEVICE FOR DETECTING COLLISION BETWEEN TWO NUMERICALLY SIMULATED OBJECTS

(75) Inventor: Xavier Merlhiot, Chatillon (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 449 days.

(21) Appl. No.: 12/442,575

(22) PCT Filed: Sep. 25, 2007

(86) PCT No.: PCT/FR2007/052002
§ 371 (c)(1),
(2), (4) Date: Mar. 24, 2009

(87) PCT Pub. No.: WO2008/037920
PCT Pub. Date: Apr. 3, 2008

(65) Prior Publication Data
US 2010/0030531 A1    Feb. 4, 2010

(30) Foreign Application Priority Data

Sep. 26, 2006    (FR) .................................... 06 08433

(51) Int. Cl.
G06G 7/48      (2006.01)
G06F 17/10     (2006.01)
G06T 17/00     (2006.01)
(52) U.S. Cl.
USPC ........ 703/6; 703/2; 703/7; 345/423; 345/419; 345/420; 345/958

(58) Field of Classification Search ....... 703/6; 345/423
See application file for complete search history.

(56) References Cited

U.S. PATENT DOCUMENTS
5,850,229 A * 12/1998 Edelsbrunner et al. ....... 345/473
(Continued)

FOREIGN PATENT DOCUMENTS
FR          2837307 A        9/2003
WO    WO 2008/037920 A1 *  4/2008

OTHER PUBLICATIONS

Stephan Cameron, "Enhancing GJK: Computing Minimum and Penetration Distances between Convex Polyhedra" Proceedings of International Conference on Robotics and Automation (1997), pp. 1-6.*

(Continued)

*Primary Examiner* — Akash Saxena
(74) *Attorney, Agent, or Firm* — Preti Flaherty Beliveau & Pachios LLP

(57) ABSTRACT

In the system for detecting collision between rigid or deformable polyhedral objects simulated numerically and represented by simplicial complexes ($K_1$, $K_2$), there is effected in a pre-processor module (110) at least one step (111) of calculating a geometrical description of the polyhedral cone corresponding to the normals in the strong sense ($n_{|K|}$ (Int $\sigma$)) associated with the faces ($\sigma$) of the simplicial complexes, and at least one step (113) of constructing trees of encompassing volumes. From information obtained from the pre-processing step, the modules (121, 122) calculate local minimum distances (LMD) and quasi local minimum distances (quasi-LMD). The system for implementing the method can be coupled to a mechanical solver (130) and to one or more peripherals (140).

5 Claims, 5 Drawing Sheets

U.S. PATENT DOCUMENTS

| | | | |
|---|---|---|---|
| 5,929,860 A * | 7/1999 | Hoppe | 345/419 |
| 6,099,573 A * | 8/2000 | Xavier | 703/7 |
| 6,108,006 A * | 8/2000 | Hoppe | 345/423 |
| 6,137,492 A * | 10/2000 | Hoppe | 345/423 |
| 6,169,549 B1 * | 1/2001 | Burr | 345/419 |
| 6,407,748 B1 * | 6/2002 | Xavier | 345/419 |
| 6,587,104 B1 * | 7/2003 | Hoppe | 345/423 |
| 6,798,415 B2 * | 9/2004 | Lake et al. | 345/474 |
| 6,862,026 B2 * | 3/2005 | Zachmann | 345/474 |
| 7,023,432 B2 * | 4/2006 | Fletcher et al. | 345/423 |
| 7,146,297 B2 * | 12/2006 | Marshall et al. | 703/6 |
| 7,548,241 B2 * | 6/2009 | Marshall et al. | 345/959 |
| 8,032,337 B2 * | 10/2011 | Deichmann et al. | 703/1 |
| 8,280,698 B2 * | 10/2012 | Montana et al. | 703/1 |
| 2003/0201973 A1 * | 10/2003 | Gould et al. | 345/156 |
| 2004/0233191 A1 * | 11/2004 | Mukherjee et al. | 345/419 |
| 2009/0119281 A1 * | 5/2009 | Wang et al. | 707/5 |
| 2010/0121626 A1 * | 5/2010 | Montana et al. | 703/6 |

OTHER PUBLICATIONS

Describing Shapes by Geometrical-Topological Properties of Real Functions; S. Biasotti et al; ACM Computing Surveys, vol. 40, No. 4, Article 12, Publication date: Oct. 2008; pp. 1-87.*

Simplicial complex; Wikipedia Definition pp. 1-4, dated Jul. 14, 2011.*

Guibas, Leonidas J. et al., "Kinetic Collision Detection: Algorithms and Experiments," Proceedings of the 2001 IEEE International Conference on Robotics & Automation, May 21-26, 2001, Seoul, Korea, IEEE, U.S., vol. 1 of 4, May 21, 2001, p. 2903-2910.

Teran, J. et al., "Adaptive physics based tetrahedral mesh generation using level sets," Engineering with Computers, 2005, 21: p. 2-18.

Lachaud, Jacques-Olivier et al., "Deformable Model with Adaptive Mesh and Automated Topology Changes," Proceedings of the Fourth International Conference on 3-D Digital Imaging and Modeling (3DIM'03), Fourth International Conference on Oct. 6-10, 2003, Piscataway, NJ, p. 12-19.

* cited by examiner

METHOD AND DEVICE FOR DETECTING COLLISION BETWEEN TWO NUMERICALLY SIMULATED OBJECTS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to a method and a system for detecting collision and for constructing and visualizing geometrical information about contact between, and more generally proximity of, a finite number of numerically-simulated objects, i.e. virtual objects.

U.S. Pat. No. 6,862,026 (document [9]) has already proposed a method of detecting collision between virtual objects based on the construction of boxes containing the objects to be considered as a function of the required movement. That prior art method verifies whether boxes containing the two objects are superposed, and where appropriate, it divides each box into two smaller boxes. Optimization is effected by using boxes having axes that are aligned with the axes of one of the objects. That method does not make use of the distance between objects.

Moreover, a method is known from reference document [1] for determining minimum local distances between three-dimensional polyhedral objects represented by triangulation of their boundaries in three dimensions, but that method is explained in relation to certain particular applications and involves relatively lengthy calculations that are not adapted to the situation of real-time simulation.

BRIEF SUMMARY OF THE INVENTION

The present invention aims to remedy the above drawbacks and to facilitate detecting collisions between a finite number of numerically-simulated objects or constructing geometrical information about proximity or contact between them, optimizing processing speed, and providing solutions that are very robust in relation to movements and rotations of the virtual objects, in particular in order not to destabilize the graphical or haptic rendering following interaction with the user, which, by its very nature, is difficult to predict.

These objects are achieved by a method of detecting collision between at least one first numerically-simulated polyhedral object and at least one second numerically-simulated polyhedral object and of constructing geometrical information about proximity and contact between them;

the method being characterized in that the first and second numerically-simulated polyhedral objects are represented in the form of simplicial complexes in $R^n$, where $R^n$ designates the Cartesian product of the body of real numbers multiplied by itself n times, with n equal to 2 or 3;

in that a pre-processing step is carried out for each simplicial complex for which the coordinates of the vertices are given in a fixed system of coordinates;

in that this pre-processing consists at least in calculating for each face of each simplicial complex a geometrical description of the polyhedral cone corresponding to the normals in the strong sense associated with that face, determining the label of the contact class to which that face belongs, and determining for each simplicial complex a tree of encompassing volumes of the object of the simplicial complex from both the position of the faces of the simplicial complex and the sets of associated normals in the strong sense; and in that, from information obtained after the pre-processing step, calculating local minimum distances and quasi local minimum distances, each quasi local minimum distance corresponding to a pair of points belonging to respective distinct objects and that would define a local minimum distance if the position of one object relative to the other were subject to a rotation by a small angle below a given threshold.

This method is applicable to numerically-simulated polyhedral objects that are rigid or deformable.

The steps of pre-processing and of calculating local minimum distances (LMD) and quasi local minimum distances (quasi-LMD) can be effected in real time.

The invention also relates to a system for detecting collision between at least one first numerically-simulated polyhedral object and at least one second numerically-simulated polyhedral object and for constructing geometrical information about proximity and contact between them;

the system being characterized in that it includes means for representing the first and second numerically-simulated polyhedral objects (10, 20) in the form of simplicial complexes in $R^n$, where $R^n$ designates the Cartesian product of the body of real numbers multiplied by itself n times, with n equal to 2 or 3;

in that it includes pre-processing means for each simplicial complex for which the coordinates of the vertices are given in a fixed system of coordinates;

in that the pre-processing means comprise at least means for calculating for each face of each simplicial complex a geometrical description of the polyhedral cone corresponding to the normals in the strong sense associated with that face, means for determining the label of the contact class to which that face belongs, and means for determining for each simplicial complex a tree of encompassing volumes of the object of the simplicial complex from both the position of the faces of the simplicial complex and the sets of associated normals in the strong sense; and in that it comprises calculation means associated with the pre-processing means for calculating local minimum distances and quasi local minimum distances, each quasi local minimum distance corresponding to a pair of points belonging to respective distinct objects and that would define a local minimum distance if the position of one object relative to the other were subject to a rotation by a small angle below a given threshold.

The system can be coupled to a mechanical solver.

The combination of the system and the mechanical solver can be coupled to at least one peripheral of the peripherals comprising in particular a graphical user interface, a mouse, a movement capture peripheral, a force feedback interface, a touch-sensitive interface, an audio interface.

In particular the invention enables stable simulation of mechanical behavior (without spurious oscillations) and the choice of a stiff haptic rendering that achieves a "feel" faithful to the situation represented.

This solution identifies the areas of contact, with the solution regularized vis-à-vis translation and rotation of the object. Thus what is going to happen can be anticipated. Processing of the contact problem can thus produce a stable solution without having recourse to an event-based approach that would require the calculation of the contact times and the adaptation of the time increments of the numerical integrator as a function of the times of the contact times.

The advantage of the proposed solution is not only providing a very stable solution for moving virtual objects in real time, but also resolving situations that are difficult to simulate, such as:
- searching for conforming contacts between objects without collision or interpenetration of the objects (for example, placing a plane object on another plane object, detection of plane contacts between two objects);
- searching for a component mounting/demounting path avoiding areas of contact and/or blocking;
- demonstrating areas of contact for objects, in particular concave objects, with a stable solution in the event of small-amplitude angular movements or movements in the vicinity of a position.

The invention is not limited to detecting point contacts, but also detects conforming contact for different topologies: line contacts or surface contacts between two objects. It also detects intersections and, under certain conditions, depths of interpenetration.

BRIEF DESCRIPTION OF THE SEVERAL VIEWS OF THE DRAWINGS

Other features and advantages of the invention emerge from the following description of particular implementations, chosen by way of example, given with reference to the appended drawings, in which.

DETAILED DESCRIPTION OF THE INVENTION

Figure 1:
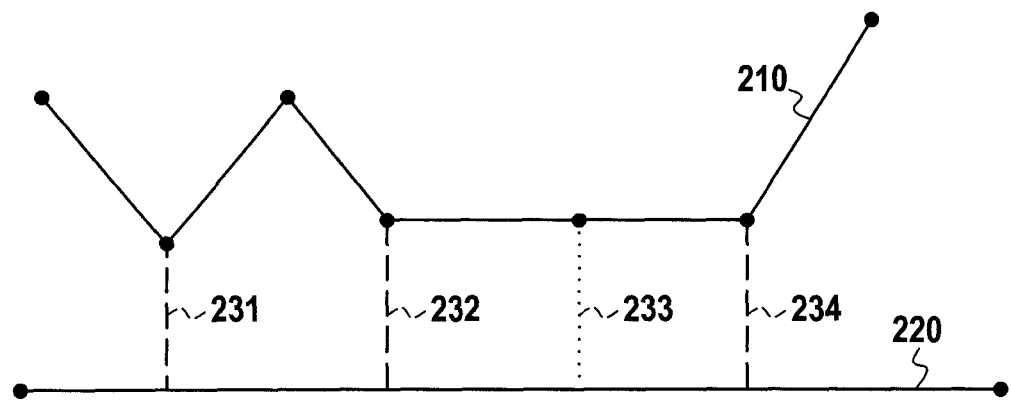
FIG. 1 is a diagram explaining one aspect of the method of the invention showing an example in two dimensions of selectively choosing or rejecting different local minimum distances (LMD) between two virtual objects.

Before describing the method and the system of the invention in detail, there follow a number of useful definitions, either standard definitions, i.e. definitions covering general concepts widely accepted by the scientific and technical community, and for which a sufficiently unified terminology exists in the scientific and technical literature, or more specific definitions, in that although these are definitions of relatively general concepts, the terminology may vary according to the author. A few definitions specific to the invention and to the field of application of the method are also given.

Standard Definitions

Below, $R^n$ designates the Cartesian product of the body of real numbers multiplied by itself n times, where n is a strictly positive integer. This space is considered to have its natural Euclidean structure. The unit sphere of $R^n$ is denoted $S^{n-1}$.

Relative Interior and Edge

Topological concepts. Let A be a portion of $R^n$. The relative interior of A is the interior of A in the natural topology (i.e. that which follows from the Euclidean structure) of the affine subspace of $R^n$ generated by A. The relative interior of A is denoted Ri(A).

Similarly, the relative edge (or relative boundary) of A is the edge of A in the natural topology of the affine subspace of $R^n$ generated by A.

Simplex

A geometrical concept. Let d be a positive or null integer. A simplex (or d-simplex, or d-dimensional simplex) of $R^n$ is defined as the convex envelope of d+1 affinely independent points of $R^n$.

Note that the topological dimension of a d-simplex is equal to d.

Face of a Simplex

Let S be a d-simplex defined as the convex envelope of the set of affinely independent points of $R^n$ $\{p_0, \ldots, p_d\}$. The simplexes defined as the convex envelopes of subsets of $\{p_0, \ldots, p_d\}$ are called the faces of the simplex S.

The simplex S is a particular face of S. The faces of a simplex S different from itself are called the proper faces of S. Their union is called the simplicial edge (or simplicial boundary) of S, denoted Bd S. The simplicial interior of S is defined as the complement of Bd S in S:

Int S=S−BdS.

The simplicial interior and the simplicial edge of a simplex coincide with the relative interior and the relative edge of that simplex, respectively.

Simplicial Complex

A simplicial complex K in $R^n$ is a set of simplexes of $R^n$ such that the following two conditions are satisfied:
- any face of an element of K is also in K;
- the intersection of any two simplexes of K is a face of each of them.

The elements of a simplicial complex are called the faces of that complex. The dimension of a simplicial complex is defined as its maximum face dimension.

The union of the faces of a simplicial complex K is called the body of the complex K, denoted |K|.

It is easy to show that the relative interiors of the faces of a simplicial complex form a partition of the body of that complex.

On this topic see also page 7 of document [2].

Polytope

A definition derived from algebraic topology. Let K be a simplicial complex in $R^n$. Assuming that each face σ of K has its natural topology (i.e. the topology induced on σ by the natural topology of $R^n$), the body of K can be provided with a topology defined in the following manner: a subset A of |K| is considered as closed in |K| if and only if A∩σ is closed in σ, for any face σ of K. The topological space defined in this way is always denoted |K| and is called the topological space underlying K, or the polytope of K.

Polyhedron

A definition derived from algebraic topology. A topological space that is the polytope of a finite simplicial complex is called a polyhedron.

Cone

A definition derived from convex analysis. Any portion C of a vector space on the body of real numbers stable by multiplication by the strictly positive real numbers is called a cone. A cone is said to be pointed when it contains the origin. Note: A cone of $R^n$ is not necessarily a body of revolution, or convex, or closed.

Polar Cone

A definition derived from convex analysis. Let A be a portion of $R^n$. The combination denoted A* and defined in the following manner:

$$A^* = \{y \in R^n / \forall x \in A, \langle y, x \rangle \leq 0\}$$

is called the polar cone of A, or simply the polar of A.

It is a convex cone, because it is the intersection of closed half-spaces. Note also that the polar of A, the polar of the convex envelope of A, and the polar of the convex cone generated by A coincide.

Tangent Cone

A definition derived from convex analysis. Let A be a portion of $R^n$ and x an element of A. A vector y of $R^n$ is said to be tangential to A at the point x if one of the following two conditions is satisfied:

y is the null vector;

y is non-null and there exists a series of $R^n$ $(x_k)_{k \in N}$ with values in $A \backslash \{x\}$ such that:

$$\lim_{k \to \infty} x_k = x$$

$$\lim_{k \to \infty} \frac{x_k - x}{\|x_k - x\|} = \frac{y}{\|y\|}$$

The set of vectors tangential to A at x is called the tangent cone to A at x and denoted $T_A(x)$.

It is a closed cone, and not necessarily convex.

For more details on tangent cones and a rigorous definition of normal cones, see for example document [3].

Expansion

A concept from the field of mathematical morphology. Let E be a metric space with a distance d. The operation of expansion of radius ϵ, also called ϵ-expansion, associates with any part A of E, the part of E, called ϵ-expanded of A, consisting of the union of balls of radius ϵ having for the center an element of A.

Partition

Set theory term. Let E be a set. A set P of parts of E is a partition of E if it satisfies the following three conditions:

the elements of P are non-empty parts of E;
the elements of P are disjoint two by two;
the union of the elements of P is equal to E.

Overlap

Set theory term. Let E be a set. An overlap of a part A of E is a collection of parts of E such that the union of those parts contains A.

Any partition of a set E is also an overlap of E.

Hierarchy

Set theory term. Let E be a finite set. A hierarchy on E is a set H of parts of E that satisfies the following three conditions:

H contains the singletons of E;
H contains E;
If A and B are two elements of H and are non-disjoint parts of E, then A contains B or B contains A.

Oriented Tree

Graph theory concept. An oriented tree is a circuitless oriented connex graph in which any vertex has an entrant degree (number of edges having this vertex as an end) less than or equal to 1.

An oriented tree has one and only one vertex the entrant degree of which is 0, whereas all the other vertices are of entrant degree 1. This vertex is called the root of the tree.

Figure 2:
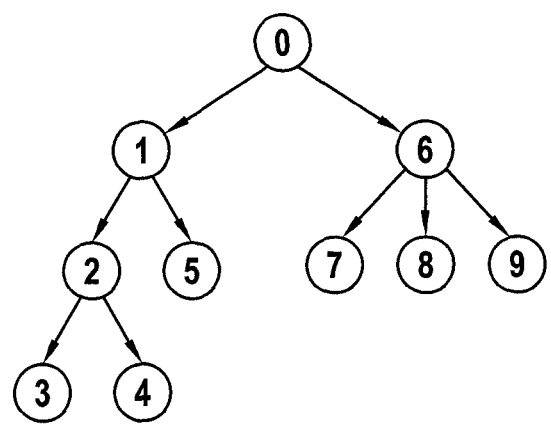
FIG. 2 shows an example of an oriented tree that can be used in a step of the method of the invention.

FIG. 2 shows an example of an oriented tree (the nodes of which are provided with labels).

The maximum length of a path in an oriented tree is called the depth of the tree.

For each node, there exists a unique path to that node starting at the root. The length of this path is called the depth of the node in the tree. The depth of the root is therefore 0. In the FIG. 2 example, the node 8 is of depth 2, whereas the node 4 is of depth 3.

The nodes whose exit degree is null are called the leaves of the tree. In the FIG. 2 example, the leaves of the tree are the nodes 3, 4, 5, 7, 8, and 9.

Let a be a node of an oriented tree. The nodes at which terminate edges starting from a are called the children of the node a. A leaf is therefore a node that has no children.

The maximum number of children of a node in an oriented tree is called the arity of the tree.

Note: the trees most used in the field of collision detection are trees of low arity, for example binary trees (arity 2), ternary trees (arity 3), or quaternary trees (arity 4).

SPECIFIC DEFINITIONS

Polyhedral Object

A polyhedral object is a physical body for which one possible geometrical representation is a polyhedron, in the sense defined above. This is valid both in a physical reference space of dimension 2 and in a space of dimension 3, the associated polyhedron being respectively a polyhedron of $R^2$ or of $R^3$.

Unitary Vector Orthogonal to a Face of a Simplex

Let S be a d-simplex of $R^n$, with d>0, σ a face of S of dimension d−1 and v the vertex of S opposite σ. Let a be the orthogonal projection of v on the affine subspace of $R^n$ generated by σ. The points a and v are distinct. The unitary vector $$\frac{a - v}{\|a - v\|}$$

is called the unitary vector orthogonal to the face σ of the simplex S and denoted $u_s(\sigma)$.

Trace of a Cone on the Unitary Sphere

Let C be a cone of $R^n$. The trace of C on the unitary sphere is the intersection of C with $S^{n-1}$. If C contains the origin, then the pointed cone generated by the trace of C on the unitary sphere is equal to C.

Normal Vectors in the Strong Sense

Let A be a part of $R^n$. A vector $R^n$ is said to be normal in the strong sense to A at the point x if it belongs to the polar of $T_A(x)$. The set of the vectors normal in the strong sense to A at the point x is therefore the convex cone $T_A(x)^*$, which is referred to as the cone normal in the strong sense to A at the point x and denoted $n_A(x)$.

Let B be a sub-part of A. A vector y of $R^n$ is said to be normal in the strong sense to A associated with B if there exists a point x of B such that y belongs to $T_A(x)^*$. The set of vectors normal in the strong sense to A associated with B is denoted $n_A(B)$.

Thus:

$$n_A(B) = \bigcup_{x \in B} n_A(x).$$

Interpenetration (or Interference)

A geometrical concept. Let A and B be two compacts of $R^n$. A and B are said to interpenetrate (or to interfere) if their interiors are not disjoint.

Point Contact

A term from the field of modeling mechanical contact phenomena. The definition proposed here is a mathematical formalization of the geometrical concept of point contact.

Let A and B be two compacts of $R^n$. A point contact between A and B is defined as an isolated point of the intersection of A and B.

Conforming Contact

A term from the field of modeling mechanical contact phenomena. The definition proposed here is a mathematical formalization of the geometrical concept of conforming contact.

Let A and B be two compacts of $R^n$. A conforming contact between A and B is defined as a connex component by arcs of the intersection of A and B, with empty interior, and not reduced to a point.

Local Minimum Distance

Let E be a metric space with a distance d. Let A and B be two parts of E. A local minimum distance between A and B, below denoted by the abbreviation LMD, is defined as a local minimum of the restriction of the function d, defined by the Cartesian product of E by itself, to the Cartesian product of A and B. A pair of points (a,b)∈A×B producing such a local minimum is called the support of the local minimum distance concerned, whereas the positive real number d(a, b) is called the value of the LMD.

Interstice

A term from the field of modeling mechanical contact phenomena. The definition proposed here is a mathematical formalization of the geometrical concept of interstice, generalized to bodies that are not necessarily convex.

Let A and B be two compacts of $R^n$. The interstices between A and B are by definition the values of LMD between A and B.

Oriented Sub-Tree or Branch

A term from graph theory. A sub-graph of an oriented tree T that is again an oriented tree is called an oriented sub-tree of T or a branch of T.

Encompassing Volume

A concept from the field of collision detection.

Here it is given a mathematical formalization.

An encompassing volume is an element of an overlap of a part of $R^n$. It is also used, although this is not standard in the field of collision detection, to designate an element of an overlap of a part of $S^{n-1}$ or of $R^n \times S^{n-1}$.

Encompassing Volume Hierarchy

A concept from the field of collision detection. Let A be a part of E, where E designates $R^n$, $S^{n-1}$ or $R^n \times S^{n-1}$. The expression "hierarchy of encompassing volumes of A" refers to any finite family $H=(V_1, \ldots, V_N)$ of parts of E, called encompassing volumes, associated with an oriented tree T, or encompassing volume tree, the nodes of which are in one-to-one relationship with the elements of H and satisfy the following property: for any oriented sub-tree T' of T having the same root as T, the elements of H associated with the leaves of T' form an overlap of A.

A consequence of this definition is that the encompassing volumes associated with the leaves of the tree T form an overlap of A. Similarly, the encompassing volume associated with the root of T overlaps A on its own.

A simple way to construct a hierarchy of encompassing volumes of a part A of E is to start by constructing a hierarchy H' on a partition of A in the set theory sense. The usual methods of this are successive subdivision from A in its entirety and successive aggregation from a partition of A. A hierarchy of encompassing volumes of A can then be constructed from H' by overlapping the reunion of the elements of each element of H' by an element of H, the oriented tree structure associated with H stemming directly from the hierarchical structure of H'.

Three concepts that are specific to the invention are introduced next.

Sub-Part of a Part of $R^n$ Provided with Associated Vectors Normal in the Strong Sense Given a part A of $R^n$ and a sub-part B of A, B is said to have associated normals in the strong sense to A (to B being understood) if there is designated the part of $R^n \times R^n$ formed by the Cartesian product of B and $n_A(B)$. Note that this set is empty as soon as $n_A(B)$ is empty.

Contact Class

Let K be a simplicial complex. The faces of K are classified into contact classes labeled from 0 to 7 as a function of their topological dimension, the topological dimension of the intersection with the unit sphere of the sets of vectors normal in the strong sense to the body of K associated with their relative interior, and where applicable the geometry of the intersection of their star in K and of the boundary (in $R^n$) of the body of K, as in Table 1 below for n=3.

TABLE 1

| Topological dimension of face σ | Topological dimension of $n_{|K|}(\text{Int } \sigma) \cap S^{n-1}$ | Geometry of intersection of star of σ in K and boundary of body of K | Label of contact class of σ |
|---|---|---|---|
| 0 | 2 | any | 0 |
| 0 | 1 | any | 1 |
| 1 | 1 | any | 2 |
| 0 | 0 | not plane | 3 |
| 0 | 0 | plane | 4 |
| 1 | 0 | any | 5 |
| 2 | 0 | any | 6 |
| any (0, 1, 2 or 3) | −1 | any | 7 |

For n=2, Table 2 below is used:

TABLE 2

| Topological dimension of face σ | Topological dimension of $n_{|K|}(\text{Int } \sigma) \cap S^{n-1}$ | Geometry of intersection of star of σ in K and boundary of body of K | Label of contact class of σ |
|---|---|---|---|
| 0 | 1 | any | 0 |
| 0 | 0 | any | 1 |
| 1 | 0 | any | 2 |
| any (0, 1 or 2) | −1 | any | 7 |

The topological dimension of the empty set is −1 by convention.

Quasi-LMD (Regularized Vis-à-vis Rotations)

An extension of the concept of local minimum distance between the expansions of two non-interfering simplicial complexes. This definition is explained below, after the elements necessary for formulating it have been covered.

The method of the invention is explained in detail next.

A hierarchical distinction can be made between two temporally disjoint steps of the method of the invention, which two steps can in turn be divided into sub-steps. These two steps are:

1. A pre-calculation step: this step is carried out during preparation of the simulation proper. It calculates data necessary for the efficiency (i.e. the speed) of the processing operations carried out in the second step.

2. An LMD calculation step: this step uses the pre-calculated information to accelerate the calculations necessary for the method and achieve a level of performance compatible with real-time simulation.

To facilitate an understanding of the method, there are first given below results that establish a link between the concept of the local minimum distance between two simplicial complexes and the concept of a set of associated vectors normal (in the strong sense) to a point or a part of a simplicial complex. The description of the method proper then continues.

The invention takes account of the following important results.

Let $K_1$ and $K_2$ be two simplicial complexes in $R^n$. Let $x_1$ and $x_2$ be two points of the bodies of $K_1$ and $K_2$, respectively. The pair $(x_1, x_2)$ is the support of an LMD between the bodies of $K_1$ and $K_2$ if and only if the following two conditions are satisfied:

$$x_2 - x_1 \in n_{|K_1|}(x_1);$$

$$x_1 - x_2 \in n_{|K_2|}(x_2).$$

Let K be a simplicial complex in $R^n$. Let x be a point of the body of K. Let $\sigma_x$ be the unique face of K whose relative interior contains x.

The tangent cone to the body of K at the point x is equal to the cone generated by $\overline{St}\sigma_x - x$;

The tangent cone to the body of K at the point x is equal to $R^n$ as soon as x belongs to the interior of |K| in $R^n$;

$$n_{|K|}(x) = (\text{Dir Aff } \sigma_x)^\perp \cap \{u_\sigma(\sigma_x), \sigma \in \overline{St}_K \sigma_x, \dim \sigma = \dim \sigma_x + 1\}^*.$$

Consequently:

If x and y are two points of the body of K contained in the relative interior of the same face σ of K, then the tangent cones to the body of K at x and y are equal;

$$n_{|K|}(x) = n_{|K|}(\text{Int}\sigma_x);$$

$n_{|K|}(\text{Int}\sigma_x)$ is a polyhedral cone.

A corollary of this result can be stated.

Assume further that the bodies of $K_1$ and $K_2$ are disjoint. The pair $(x_1, x_2)$ is the support of an LMD between the bodies of $K_1$ and $K_2$ if and only if the following two conditions are satisfied:

$$\frac{x_2 - x_1}{\|x_2 - x_1\|}$$

belongs to $n_{|K_1|}(x_1)$;

$$\frac{x_1 - x_2}{\|x_1 - x_2\|}$$

belongs to $n_{|K_2|}(x_2)$.

It is deduced in particular from this that the pairs of points $(x_1, x_2)$ that are supports of local minimum distances between the bodies of $K_1$ and $K_2$ are such that $n_{|K_1|}(x_1)$ and $n_{|K_2|}(x_2)$ are not reduced to $\{0\}$.

Let $K_1$ and $K_2$ be two simplicial complexes in $R^n$ with disjoint bodies. Let $A_1$ and $A_2$ be parts of the bodies $K_1$ and $K_2$, respectively. If there exist(s) at least one pair of points $(x_1, x_2)$ in $A_1 \times A_2$ that support(s) an LMD between the bodies of $K_1$ and $K_2$ then the following three conditions are satisfied:

1. $P_1(A_1, A_2)$: the intersection of $n_{|K_1|}(A_1)$ and $-n_{|K_2|}(A_2)$ is not reduced to $\{0\}$.
2. $P_2(A_1, A_2)$ the intersection of $n_{|K_1|}(A_1)$ and the cone generated by $A_2 - A_1$ is not reduced to $\{0\}$.
3. $P_3(A_1, A_2)$ the intersection of $-n_{|K_2|}(A_2)$ and the cone generated by $A_2 - A_1$ is not reduced to $\{0\}$.

The main aspects of the method of the invention can now be explained.

The method of the invention is applicable to rigid polyhedral objects and to deformable polyhedral objects on condition that the deformations correspond to displacements of the vertices of the underlying simplicial complexes.

The invention improves and expands the method proposed in document [1], which is used to calculate local minimum distances between solid polyhedral objects represented by a triangulation of their boundary in three dimensions.

The invention corrects and clarifies the definition of the associated normals (in the strong sense) at a point of the boundary of such a polyhedron using the well-established theory of convex analysis.

The invention expands the method proposed by document [1] to the general situation of simplicial complexes (possibly expanded) in two and three dimensions, which includes in particular:

surface polyhedral objects (plates, shells, panels, etc.);
linear polyhedral objects (cables, beams, etc.);
hybrid topology polyhedral objects (skeletons, etc.);
clouds of points (unions of balls, etc.).

The introduction of expansions increases the representation potential of the geometrical model that constitutes the polyhedral complex concept. The expansion of a purely surface polyhedral complex can therefore represent the half-thickness of a shell, that of a purely linear complex the mean radius of cable, and so on.

It is possible to generalize the invention to median axis representations.

The important results referred to above restrict the calculation-based search for local minimum distances between the bodies of two simplicial complexes $K_1$ and $K_2$ with disjoint bodies to only those pairs of points $(x_1, x_2)$ of the bodies of $K_1$ and $K_2$ such that $n_{|K_1|}(x_1)$ and $n_{|K_2|}(x_2)$ are not reduced to $\{0\}$. This can nevertheless represent an infinite number of pairs of points to be tested, and it is therefore not possible to base a method of calculating the LMD between two simplicial complexes on an exhaustive exploration of these candidate pairs.

The last result explained above is an important additional element for the functioning of the method, because it provides a necessary condition that can be used to locate local minimum distances between the bodies of $K_1$ and $K_2$.

Assume that finite partitions $P_1$ and $P_2$ of the bodies of $K_1$ and $K_2$, respectively, exist. A calculation method of restricting the possible loci of pairs of support points of LMD between the bodies of $K_1$ and $K_2$ evaluates the predicates $P_1$, $P_2$, and $P_3$ that correspond to the conditions 1 to 3 given above for each pair $(A_1, A_2) \in P_1 \times P_2$. The number of pairs to be tested is equal to the product of the cardinals of $P_1$ and $P_2$.

Assume now that the complexes $K_1$ and $K_2$ are finite (i.e. have a finite number of faces). One possible choice for the partition $P_1$ (respectively $P_2$) is then the set of the simplicial interiors of the faces of $K_1$ (respectively $K_2$). The pairs to be tested are then (Int $\sigma_1$, Int $\sigma_2$), $\sigma_1$ belonging to $K_1$ and $\sigma_2$ to $K_2$. Moreover, as the predicate is false as soon as $P_1$(Int $\sigma_1$, Int $\sigma_2$) is reduced to $n_{|K_1|}(\text{Int}\sigma_1)$ or $n_{|K_1|}(\text{Int}\sigma_1)$ is reduced to $\{0\}$, the tests to be carried out can be restricted to only those pairs (Int $\sigma_1$, Int $\sigma_2$) such that $n_{|K_1|}(\text{Int }\sigma_1)$ or $n_{|K_1|}(\text{Int}\sigma_1)$ are not reduced to $\{0\}$. With a view to accelerating progress through these pairs of faces, the method of the invention uses a hierarchy of encompassing volumes that is described below.

Consider first a pair of faces $(\sigma_1,\sigma_2) \in K_1 \times K_2$. It can be shown that a pair of points $(x_1,x_2) \in (\text{Int}\sigma_1, \text{Int}\sigma_2)$ is the support of an LMD between $|K_1|$ and $|K_2|$ if and only if the following two conditions are satisfied:

$(x_1, x_2)$ is the support of an LMD between Int $\sigma_1$ and Int $\sigma_2$;

$x_2 - x_1 \in n_{|K_1|}(\text{Int}\sigma_1)$;

$x_1 - x_2 \in n_{|K_2|}(\text{Int }\sigma_2)$.

Given the above results, it can be shown that a pair of points $(x_1,x_2) \in \text{Int}\sigma_1 \times \text{Int}\sigma_2$ is the support of an LMD between Int $\sigma_1$ and Int $\sigma_2$ if and only if the vector $x_2 - x_1$ belongs to $(\text{Dir Aff } \sigma_1)^\perp \cap (\text{Dir Aff } \sigma_2)^\perp$. Consequently, such a pair of points is also an LMD between Aff $\sigma_1$ and Aff $\sigma_2$. To be more precise, a pair of points $(x_1,x_2) \in \text{Aff}\sigma_1 \times \text{Aff}\sigma_2$ is an LMD between Int $\sigma_1$ and Int $\sigma_2$ if and only if $(x_1, x_2)$ belongs to Int $\sigma_1 \times$ Int $\sigma_2$ and $x_2 - x_1$ to $(\text{Dir Aff } \sigma_1)^\perp \cap (\text{Dir Aff } \sigma_2)^\perp$.

The results set out in the previous two paragraphs enable a practical method to be constructed for calculating pairs of points $(x_1,x_2) \in $ Int $\sigma_1 \times$ Int $\sigma_2$ that are LMDs between $|K_1|$ and $|K_2|$:

Calculate the locus of the points $(x_1,x_2) \in \text{Aff } \sigma_1 \times \text{Aff } \sigma_2$ such that $x_2 - x_1$ belongs to $(\text{Dir Aff }\sigma_1)^\perp \cap (\text{Dir Aff }\sigma_2)^\perp$.

Calculate the intersection of this locus with Int $\sigma_1 \times$ Int $\sigma_2$.

Of the elements $(x_1, x_2)$ of the set obtained in this way, retain only those that satisfy $x_2 - x_1 \in n_{|K_1|}(\text{Int}\sigma_1)$ and $x_1 - x_2 \in n_{|K_2|}(\text{Int }\sigma_2)$.

There are therefore obtained precisely the pairs of points $(x_1,x_2) \in$ Int $\sigma_1 \times \text{Int}\sigma_2$ that are LMDs between $|K_1|$ and $|K_2|$.

It should be noted that the sets of pairs of points successively calculated in the above method can be infinite, which corresponds to conforming contact between expanded polyhedral objects. It is possible to give a simple geometrical description of these sets of pairs of points for $R^3$ and $R^2$ (they are polyhedral sets), but the infinite character of the number of LMDs obtained in the end makes it impossible to take explicitly into account each of these LMDs in interstice form in a numerical method aiming to simulate the phenomena of contact between polyhedral solids. However, it is possible to show, using simple convex analysis arguments, that it is not necessary to take each of these LMDs into account to ensure compliance with unilateral constraints of non-interpenetration of the objects. This is why these situations that from a geometrical point of view correspond only to parallelism between Aff $\sigma_1$ and Aff $\sigma_2$ are ignored in the method of the invention.

Tables 3 and 4 below give the possible numbers of LMDs between Int $\sigma_1$ and Int $\sigma_2$ for $R^3$ and $R^2$.

TABLE 3

Number of local minimum distances between Int $\sigma_1$ and Int $\sigma_2$ when $\sigma_1$ and $\sigma_2$ are disjoint simplexes of $R^3$.

| dim$\sigma_1$ | dim$\sigma_2$ | | | |
|---|---|---|---|---|
| | 0 | 1 | 2 | 3 |
| 0 | 0 or 1 | 0 or 1 | 0 or 1 | 0 |
| 1 | | 0 or 1 or infinity | 0 or infinity | 0 |
| 2 | | | 0 or infinity | 0 |
| 3 | | | | 0 |

TABLE 4

Number of local minimum distances between Int $\sigma_1$ and Int $\sigma_2$ when $\sigma_1$ and $\sigma_2$ are disjoint simplexes of $R^2$.

| dim$\sigma_1$ | dim$\sigma_2$ | | |
|---|---|---|---|
| | 0 | 1 | 2 |
| 0 | 0 or 1 | 0 or 1 | 0 |
| 1 | | 0 or infinity | 0 |
| 2 | | | 0 |

The details of the practical calculations associated with processing each of the situations of the above tables are explained below. Two essential remarks should be made first, however:

In certain special cases where the number of LMDs between $|K_1|$ and $|K_2|$ whose support is on Int $\sigma_1 \times$ Int $\sigma_2$ is nevertheless a finite set, these LMDs can in fact be ignored in the context of constructing a set of points of contact between rigid solids in the absence of dry rubbing at the contact. Eliminating these LMDs reduces the number of points of contact used (and thus the calculation times of the numerical methods used in a numerical solver processing the contact) without this generating errors that could lead to interpenetration of the rigid solids. The special cases in question in fact correspond to LMDs that pass through the relative interior of conforming contacts between the expanded polyhedral solids. Their elimination thus corresponds to retaining only the LMDs that either intersect the relative edge of the convex envelope of a conforming contact between the expanded polyhedral solids or pass through a point contact between those solids. FIG. 1 gives a typical example of the cases finally retained in two dimensions.

Between the representations 210, 220 of two objects there are shown four LMDs 231 to 234. In this example, the LMDs (in thicker dashed line) 231, 232, 234 have been retained and the LMD 232 (in thinner dotted line) that is of no utility has been rejected.

Algorithms for resolving evolution problems involving contact can be classified into two main groups: event-based algorithms, which calculate precisely the times of transition between separation and contact, and time-stepping algorithms, which use an interaction time step fixed in advance. Only time-stepping algorithms can be executed in real time at present for a large contact number of an infinite accumulation (the well-known Zeno effect, which corresponds to an infinity of transitions during a finite time interval, as with a rigid ball subject to gravity that bounces on a plane with a coefficient of elasticity strictly between 0 and 1).

With a time-stepping algorithm it can prove difficult to stabilize a polyhedral object represented by a simple cube placed on a plane and subject to gravity if the only points of contact considered come from the LMDs from the cube and the plane. The only situation enabling stabilization of the cube corresponds to the simultaneous existence of strictly more than one LMD between the cube and the plane, which corresponds to parallelism between a face of the cube and the plane. In this situation, there exists an infinity of LMDs between the cube and the plane (their support on the cube corresponds to the whole of a face thereof). It follows from the above remark that retaining only the four LMDs that would correspond to the four corners of the cube placed on the plane to determine a finite set of points of contact would be sufficient. Now, not only is parallelism difficult to characterize numerically, as it involves evaluating accurately (or in a manner that is sufficiently well managed) predicates of equality between real numbers represented in machine code, but also stabilizing the cube on the plane involves being able to pass in a stable manner during the simulation through states in which no face of the cube is parallel to the plane, but where small-amplitude rotations would lead to passing through that state (during the time step). A face of the cube is then "almost parallel" to the plane, and a low-amplitude rotation is sufficient for the required four LMDs to exist (possibly completely isolated in time). This is why the invention introduces the quasi-LMD concept, which corresponds to a pair of points that would support an LMD if the position of one body relative to the other were to rotate through a small angle, the maximum measurement of which is a parameter of the method.

Eliminating an LMD of no utility for the problem of contact or taking account of a quasi-LMD can be rendered systematic as a function of simple local criteria that formalize the classes of contact accompanied by a summary table of compatibility and of angular regularization described below (Table 5).

It should be noted that, apart from the fact that the method of the invention is generalistic, it has fundamental advantages that flow from the use of the quasi-LMD concept and from the possibility of eliminating an LMD that is of no utility for the contact problem.

Moreover, the sets $n_{|K|}(Int\sigma)$ are polyhedral cones that for a rigid body can be pre-calculated.

Finally, the invention takes into account the fact that examining all the pairs $(\sigma_1,\sigma_2) \in K_1 \times K_2$ is of no utility and can be speeded up by using a hierarchy of encompassing volumes of $|K_1|$ and $|K_1|$ with respective associated normals in the strong sense. For a rigid body, these hierarchies of encompassing volumes can be entirely pre-calculated. For a deformable body represented by a finite simplicial complex K, the following solution is applicable:

use a hierarchy H' on the partition of |K| to form the simplicial interiors of the faces of K for constructing a hierarchy of encompassing volumes H for a reference deformation state;

retain between two deformed states of the same structure a hierarchy of encompassing volumes based on H' and merely update the geometry of each encompassing volume in order to adapt to the deformations of the faces of K.

Using hierarchies of encompassing volumes is a standard technique in the field of collision detection. The invention uses a method that improves on that proposed by document [1].

The pre-calculation step of the method of the invention is described in detail next.

Below, it is assumed that n is a fixed integer equal to 2 or 3.

The input data is constructed by a finite family of simplicial complexes of $R^n$.

The output data comprises:

For each face σ of each simplicial complex K:

a geometrical description of the polyhedral cone $n_{|K|}(Int\ \sigma)$;

the label of the contact class to which the face belongs.

For each input simplicial complex K: a tree of encompassing volumes of the body of the simplicial complex provided with associated normals in the strong sense. The encompassing volumes are therefore parts of $R^n \times R^n$. Each encompassing volume used by the invention is the Cartesian product of a ball of $R^n$ and a cone $R^n$. In the $R^3$ situation, the cones concerned are single or double bodies of revolution, possibly with a null aperture (half or complete straight line segment). In the $R^2$ situation, the cones concerned are obtained from the 3-dimensional situation by intersection of the cones with a plane containing their axis of revolution.

Each leaf node of the tree is associated with one or more faces of K. A face of K is associated with more than one leaf of the tree. The faces of K associated with the leaves of the tree are precisely those faces for which the set of associated normals in the strong sense to the body of K is non-empty. The encompassing volume associated with a leaf node overlaps the part of the body of K, with the associated normals, formed by the union of the simplicial interiors of the faces of K associated with that leaf.

Each node of the tree (whether it is a leaf node or not) is associated with:

an encompassing volume that overlaps the part of the body of K, with associated normals, formed by the union of the simplicial interiors of the faces of K associated with the leaf of the branch of the tree generated by that node;

for each contact class of label i (i from 0 to 7), a Boolean value equal to the evaluation of the following predicate: there exists, among the leaves of the branch of the tree generated by this node, at least one leaf associated with at least one face of K for which the class label is i.

The processing effected for each input simplicial complex K is described below. It is assumed that the coordinates of the vertices of K are given in a fixed system of coordinates. For a rigid body, it is natural and convenient to choose a system of axes tied to that body. For a deformable body, a reference system of axes can be chosen, for example, to fix the coordinates of the vertices of K in a so-called reference deformation state (for example, the rest state for a body for which the behavior law is elastic).

A first step of the pre-processing stage of the method of the invention calculates the normals in the strong sense and the contact classes.

This entails calculating a geometrical description of $n_{|K|}$ (Int σ) for each face σ of K. Remember the following result:

$$n_{|K|}(\sigma) = (\text{Dir Aff } \sigma)^\perp \cap \{u_{\sigma'}(\sigma), \sigma' \in \overline{St}_K\sigma, \dim \sigma' = \dim \sigma+1\}^*.$$

There is a number of choices for representing this kind of polyhedral cone in machine code. Given that in the calculations necessary during the LMD search phase, the vector sub-space $(\text{Dir Aff } \sigma)^\perp$ does not need to be represented in machine code. A representation of the convex cone $\{u_{\sigma'}(\sigma), \sigma' \in \overline{St}_K\sigma, \dim \sigma' = \dim \sigma+1\}^*$ is sufficient.

For a rigid body, it is beneficial to work in a system of coordinates tied to the body and to use a polar representation of $\{u_{\sigma'}(\sigma), \sigma' \in \overline{St}_K\sigma, \dim \sigma' = \dim \sigma+1\}^*$, which amounts to representing the generated convex cone:

$$\{u_{\sigma'}(\sigma), \sigma' \in \overline{St}_K\sigma, \dim \sigma' = \dim \sigma+1\}$$

by its edges, that is to say by a minimal sub-set of $\{u_{\sigma'}(\sigma), \sigma' \in \overline{St}_K\sigma, \dim \sigma' = \dim \sigma+1\}$ that generates the same convex cone.

For a deformable body, the sub-set of the vectors that direct the edges of the convex cone generated by $\{u_{\sigma'}(\sigma), \sigma' \in \overline{St}_K\sigma, \dim \sigma' = \dim \sigma+1\}$ can vary, and it is therefore more beneficial to retain all the $u_{\sigma'}(\sigma)$ in the polar representation.

For example, it is possible to examine a face σ that is a vertex of a polyhedral complex in $R^3$. Then:

$$(\text{Dir Aff } \sigma)^\perp = R^3;$$

whence:

$$n_{|K|}(\sigma) = \{u_{\sigma'}(\sigma), \sigma' \in \overline{St}_K\sigma, \dim \sigma' = 1\}^*$$

There follows calculating $u_{\sigma'}(\sigma)$ and then extracting from them a minimal sub-set that generates the same convex cone. This can easily be effected by seeking the planes that constitute the faces of the convex polyhedral cone generated by $\{u_{\sigma'}(\sigma), \sigma' \in \overline{St}_K \sigma, \dim \sigma' = 1\}$, which amounts to eliminating successively the $u_{\sigma'}(\sigma)$ that are not director vectors of an edge of this cone. These planes are generated by independent vector pairs taken from $u_{\sigma'}(\sigma)$ and are such that all the other $u_{\sigma'}(\sigma)$ are on the same side of those planes.

There are several possibilities:

1. $\{u_{\sigma'}(\sigma), \sigma' \in \overline{St}_K \sigma, \dim \sigma' = 1\}$ is empty, and thus $n_{|K|}(\sigma) = R^3$. The contact class of $\sigma$ is therefore the class of label 0.
2. $\{u_{\sigma'}(\sigma), \sigma' \in \overline{St}_K \sigma, \dim \sigma' = 1\}$ have no independent vectors, in which situation there are two further possibilities:
   a. All the $u_{\sigma'}(\sigma)$ are of the same direction. It then suffices to retain only one of them and the label of the contact class of $\sigma$ is 0.
   b. There exist $u_{\sigma'}(\sigma)$ in the opposite direction. The cone generated by the $u_{\sigma'}(\sigma)$ is then a vector straight line segment and the contact class of $\sigma$ is of label 1.
3. There exists a plane generated by a pair of independent vectors $u_{\sigma'}(\sigma)$ enabling placement of all the other $u_{\sigma'}(\sigma)$ in the same open half-space. It can then be shown that the convex cone generated by the $u_{\sigma'}(\sigma)$ contains no vector straight line segment. It is then necessary to seek the other vector pairs $u_{\sigma'}(\sigma)$ that generate planes satisfying the same property. The vectors concerned can be ordered in circular fashion; the others are inside the cone and do not constitute part of the required minimal representation. The contact class of $\sigma$ is of label 0.
4. There exists a plane generated by a pair of independent vectors $u_{\sigma'}(\sigma)$ enabling placement of all the other $u_{\sigma'}(\sigma)$ in the same closed half-space, but not in the same open half-space. There are then at least three $u_{\sigma'}(\sigma)$ in this plane. Three situations arise:
   a. The $u_{\sigma'}(\sigma)$ contained in this plane generate a convex cone that is equal to this plane, and there are two possibilities:
      i. There exist $u_{\sigma'}(\sigma)$ that are not in this plane. The required convex cone is in fact a half-space delimited by the plane that has been found and the contact class of $\sigma$ is of label 3.
      ii. All the $u_{\sigma'}(\sigma)$ are in the plane that has been found. The required convex cone is equal to this plane and the contact class of $\sigma$ is of label 4.
   b. The $u_{\sigma'}(\sigma)$ in this plane generate a convex cone that is equal to a closed half-plane, and there are two possibilities:
      i. There exist $u_{\sigma'}(\sigma)$ that are not in this plane. The convex cone generated by $u_{\sigma'}(\sigma)$ then has exactly two faces and there remains exactly one plane to be found. The contact class of $\sigma$ is of label 1.
      ii. All $u_{\sigma'}(\sigma)$ are in this plane. The required convex cone is exactly equal to the closed half-plane that has been found and the contact class of $\sigma$ is of label 1.
   c. The $u_{\sigma'}(\sigma)$ in this plane generate a convex cone that is a plane angular sector strictly included in a half-plane. Then only the edge vectors of this sector are retained, and the situation reverts to that of the above situation 3.
5. No plane generated by the pairs of $u_{\sigma'}(\sigma)$ enables placement of all the $u_{\sigma'}(\sigma)$ in the same half-space. The $u_{\sigma'}(\sigma)$ then generate a convex cone that is in fact all $R^3$, and $n_{|K|}(\sigma) = \emptyset$. The contact class of $\sigma$ is of label 7.

A second step of the pre-processing stage of the method of the invention is described below. This second step relates to constructing the hierarchy of encompassing volumes.

Various approaches to the construction of the hierarchy of encompassing volumes are possible. The standard primary distinction is between top-down approaches by successive subdivision and bottom-up approaches by aggregation. It should be noted that document [1] relies on the PQP library (see documents [4] and [5]) to perform this task. Now, PQP is based only on the position of the geometrical primitives (points, edges, triangles) for construction of a hierarchy, and does not use the associated normals.

The invention proposes to use both the position of the faces $\sigma$ of the simplicial complex and the sets of associated normals $n_{|K|}(\sigma)$. To this end, it can be useful to calculate beforehand a circular section encompassing cone for each $n_{|K|}(\sigma)$, which entails only elementary geometrical calculations and raises no particular problems for the person skilled in the art.

The invention proposes the following steps, the aim of which is the construction of a hierarchy (in the set theory sense) of the partition of the body of K formed by the simplicial interiors of its faces. This is a top-down method, which operates recursively by subdividing sets of elements of this partition, starting with the set of all the elements of the partition, which are therefore associated with the root of the tree. The criterion for stopping iteration corresponds to processing the sets of elements of the partition of cardinal 1 (the singletons, i.e. only one Int $\sigma$) that are associated with the leaves of the tree.

The subdivision process takes the following form: alternatively (or in accordance with a heuristic that depends on the context of use) in the sense of position and orientation, subdivisions are effected in accordance with the standard criterion of the median on the highest inertia axis (see for example document [1]). The expression "in the sense of position" must be understood as referring to the use of barycenters of $\sigma$. The expression "in the sense of orientation" must be understood as referring to the use of the axes of the circular section cones that encompass $n_{|K|}(\sigma)$.

Experimentally, an effective heuristic is to perform the first three or four subdivisions according to position and then to alternate between position and orientation (this is the subdivision strategy known as splitting).

Once the hierarchy has been constructed, it suffices to calculate encompassing volumes for each node of the hierarchy. With regard to the spheres that encompass the positions of the faces associated with a node, there are two possible strategies:

1. To calculate the sphere of minimum radius that encompasses the faces associated with each node.
2. To calculate minimum spheres for the leaves of the tree and then to ascend the tree successively by hierarchical inclusion of the encompassing spheres.

In both situations, standard methods exist and are available in the literature. In the rigid situation, solution 1 is more effective. In the deformable situation, the search for efficiency in the updating of the encompassing volume hierarchy means that a hybrid solution is preferable: use solution 1 for the "bottom" of the tree and solution 2 for the "top". The distinction between the top and the bottom of the tree can employ a criterion of node depth, with a depth threshold to be adjusted by trial and error.

With regard to the circular section cones that must encompass the sets of normals of the faces that are associated with the nodes, a solution analogous to solution 2 for the solutions has the advantage of simple implementation (it suffices to calculate cones that simply encompass cone pairs).

Where efficiency is concerned, it is equally beneficial to ascend the hierarchy of volumes encompassing the information as to the faces belonging to the various contact classes (see above). This hardens the node-by-node tests (see below) and therefore makes descending the hierarchies more selective and therefore quicker. This does not give rise to any particular problem. It suffices to associate with each node a collection of eight Boolean values that indicate, for each of the eight classes, the existence among the faces associated with the node of at least one face belonging to the class.

Note finally that, in the rigid situation only, the class of each face is definitively determined at initialization. Consequently, as explained below, the faces belonging to the class of label 7 can be omitted because they cannot support an LMD or even a quasi-LMD.

A step of the method of the invention that follows preprocessing and calculates (quasi) local minimum distances is described below.

Two parameters of the method that are introduced at this point can be modified as required between two requests and modifying them does not invalidate the preceding pre-calculation step.

The first parameter, $\gamma_{max}$, is a positive or null angular value for defining the quasi-LMD concept (any LMD is a quasi-LMD). The second parameter, $d_{max}$, is a distance threshold (positive or null, possibly infinite) for restricting the quasi-LMD calculation to only quasi-LMDs with a value below this threshold.

Two simplicial complexes $K_1$ and $K_2$ are considered below. The operation that is described here for one pair of complexes must be applied to each pair of distinct complexes among the input complexes.

This step of the invention is analogous to that of the method proposed in document [1] but introduces the following extensions:

- The node-by-node tests take account of any expansions applied to the complexes $K_1$ and $K_2$, with respective values $\epsilon_1$ and $\epsilon_2$. The test on the relative position of the nodes therefore consists in verifying that the centers of the associated encompassing spheres are separated by a distance of at most $R_1+R_2+\epsilon_1+\epsilon_2+d_{max}$, where $R_1$ and $R_2$ are the radii of the spheres. In contrast, the dual cone (see document [1]) is based on the non-expanded spheres.
- The node-by-node tests take account of the tolerance in respect of the misalignment $\gamma_{max}$. Consequently, in tests for intersection of the various cones, the circular section cones that encompass the normals must be replaced by cones with the same axis whose half-aperture at the apex is increased by $\gamma_{max}$.
- The node-by-node tests include an additional test based on the contact classes. It is assumed that the two nodes to be tested include vectors of Boolean values relating to their faces belonging to the contact classes $c_1$ and $c_2$. The $i^{th}$ component of such a vector is a Boolean value that indicates if there exists among the faces associated with the node at least one face belonging to the class of label i. The test evaluates the Boolean $c_1^T C c_2$, where C is the following symmetrical Boolean matrix, called the matrix of compatibility between contact classes, the test being validated if and only if the resulting Boolean value is 1:

$$C = \begin{pmatrix} 1 & 1 & 1 & 1 & 1 & 1 & 1 & 0 \\ 1 & 1 & 1 & 1 & 0 & 0 & 0 & 0 \\ 1 & 1 & 1 & 1 & 0 & 0 & 0 & 0 \\ 1 & 1 & 1 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \\ 0 & 0 & 0 & 0 & 0 & 0 & 0 & 0 \end{pmatrix}$$

The leaf-by-leaf tests take into account the expansions of the complexes and the tolerance in respect of the misalignment $\gamma_{max}$. The principle of these tests is first to calculate the unique LMD between the affine spaces generated by the two faces tested (as explained above, situations of parallelism are rejected without prejudice), then to verify that its support is situated on the product of the simplicial interiors of the faces. This corresponds to elementary geometrical calculations that the person skilled in the art knows perfectly well and are described in detail in document [6], for example. If an LMD $(x_1,x_2) \in \text{Int}\sigma_1 \times \text{Int}\sigma_2$ between the simplicial interiors of the faces is found, it remains to verify, as explained above, that it is compatible with the cones of normals in the strong sense associated with the simplicial interiors of the faces, i.e. to test if $x_2-x_1$ belongs to $n_{|K_1|}(\text{Int}\sigma_1)$ and if $x_1-x_2$ belongs to $n_{|K_2|}(\text{Int}\sigma_2)$. This test is easy to carry out because the pre-calculation step has produced a representation of $n_{|K_1|}(\text{Int }\sigma_1)$ and $n_{|K_2|}(\text{Int }\sigma_2)$ in the form of the polar of a finite set of vectors of the type $u_{\sigma'}(\sigma)$. The constraint of belonging to this polar cone must be made more flexible to take account of a maximum misalignment of $\gamma_{max}$, which can be approximated simply by considering not the cone polar to the vectors $u_{\sigma'}(\sigma)$ (i.e. the set of vectors that form an angle of at least $$\frac{\pi}{2}$$

with each $u_{\sigma'}(\sigma)$), but the set of vectors that form an angle of at least $$\frac{\pi}{2} - \gamma_{max}$$

with each $u_{\sigma'}(\sigma)$. Making the constraint more flexible like this must not be effected in all situations, but must obey the rules of Table 5 below.

TABLE 5

| $\sigma_1$ contact class label | $\sigma_2$ contact class label | | | | | | | |
|---|---|---|---|---|---|---|---|---|
| | 0 | 1 | 2 | 3 | 4 | 5 | 6 | 7 |
| 0 | (0, 0) | (0, 0) | (1, 0) | (1, 0) | (1, 0) | (1, 0) | (1, 0) | Ø |
| 1 | (0, 0) | (1, 1) | (1, 1) | (1, 0) | Ø | Ø | Ø | Ø |
| 2 | (0, 1) | (1, 1) | (1, 1) | (1, 0) | Ø | Ø | Ø | Ø |
| 3 | (0, 1) | (0, 1) | (0, 1) | Ø | Ø | Ø | Ø | Ø |
| 4 | (0, 1) | Ø | Ø | Ø | Ø | Ø | Ø | Ø |
| 5 | (0, 1) | Ø | Ø | Ø | Ø | Ø | Ø | Ø |
| 6 | Ø | Ø | Ø | Ø | Ø | Ø | Ø | Ø |
| 7 | Ø | Ø | Ø | Ø | Ø | Ø | Ø | Ø |

Table 5 shows the angular regularization rules for defining the quasi-LMDs. The table must be used like a double-entry table. In each box of the table there is either a pair of Boolean values or the symbol Ø. If a pair of Boolean values is present in a box, the first value (respectively the second value) indicates if the polar cone to the vectors $u_{\sigma'}(\sigma)$ associated with the face $\sigma_1$ (respectively $\sigma_2$) must be replaced by the set described above with parameters set by the value of $\gamma_{max}$. The symbol Ø identifies cases that must be rejected (those of no utility referred to above).

For deformable bodies, the geometry of the encompassing volumes (spheres and circular section cones) must be updated after modifying the deformation state, which does not add any further difficulty because the standard updating methods apply directly.

In a variant of the invention, there are calculated not only the distances between objects, for highlighting the areas of proximity, but also the speeds of relative movement, which enables automatic local adaptation of the distance thresholds.

In another variant of the invention, the calculations are performed in parallel to make best possible use of a parallel architecture, for example based on multiple-core processors, in order to accelerate the real-time simulations.

In another variant of the invention, the method is generalized to the objects represented by a polyhedral median axis (see for example documents [7] and [8].

An advantage of the method of the invention using quasi-LMDs is to be regularized vis-à-vis translations and rotations, which yields solutions that are very robust vis-à-vis displacements and rotations of the virtual object. The graphical and/or haptic rendering is therefore not destabilized by interaction with the user, which by its nature is difficult to predict.

Another advantage of the method is to enable fast calculation and thus integration into a real-time simulator. The invention therefore enables stable simulation of mechanical behavior without spurious oscillations.

An implementation of the method of the invention is described with reference to FIGS. 3 to 7.

These figures show the images of two numerically-simulated objects 10, 20, namely a cube 10 and a plane 20, but the invention is naturally applicable to objects of very varied shapes.

FIGS. 3 to 7 show various visualizations of the areas of contact between or proximity of the two virtual objects when there is relative movement between them.

FIGS. 3 to 7 represent a system of axes XYZ associated with the cubical object 10. In the present example, it is considered that the plane is fixed and that the relative movements between the two objects 10 and 20 are determined only by displacements (rotations or translations) of the cubical object 10.

The cubical object 10 has a face that has corners A, B, C, D.

Figure 3:
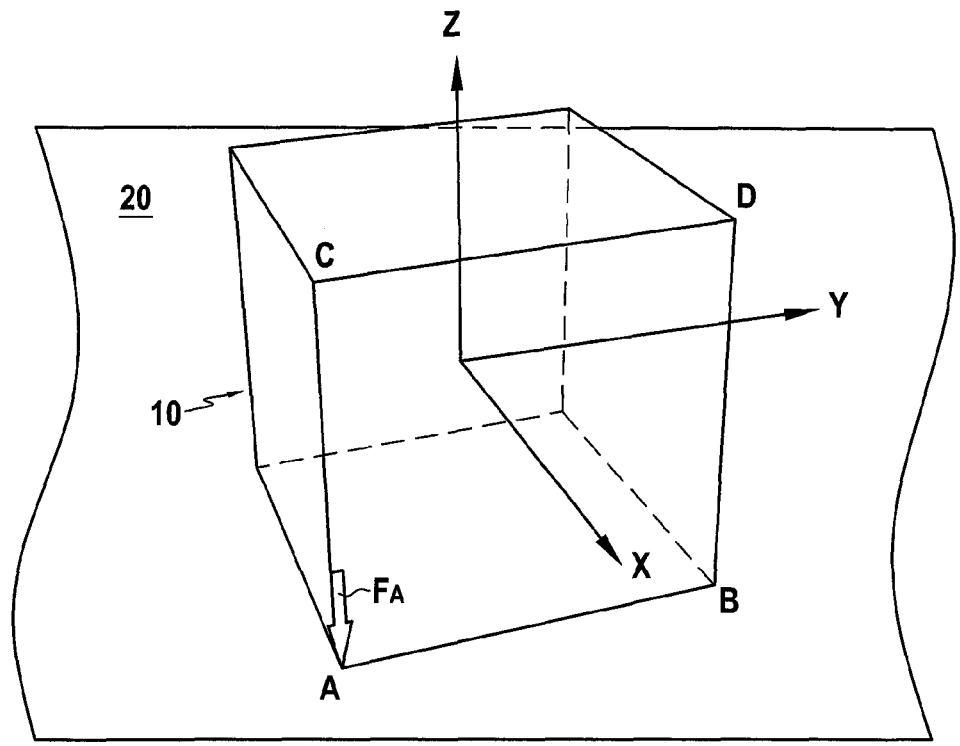
FIGS. 3 to 7 show diverse relative positions of a cubical first object and plane second object simulated numerically, which can be visualized by the method of the invention.
Figure 4:
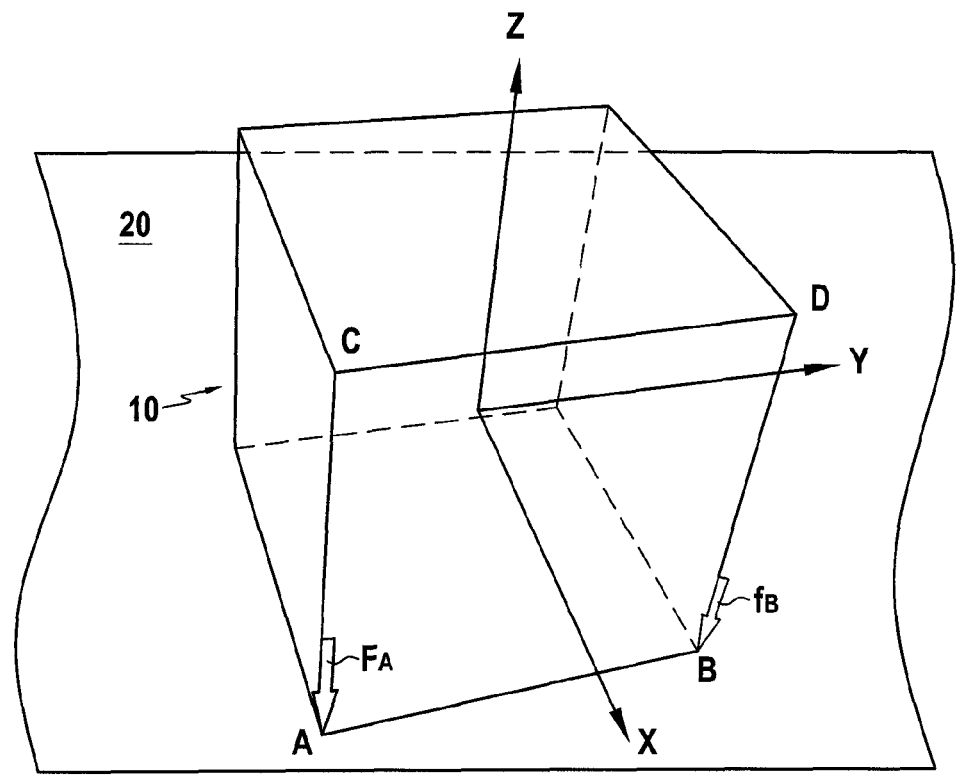
Figure 5:
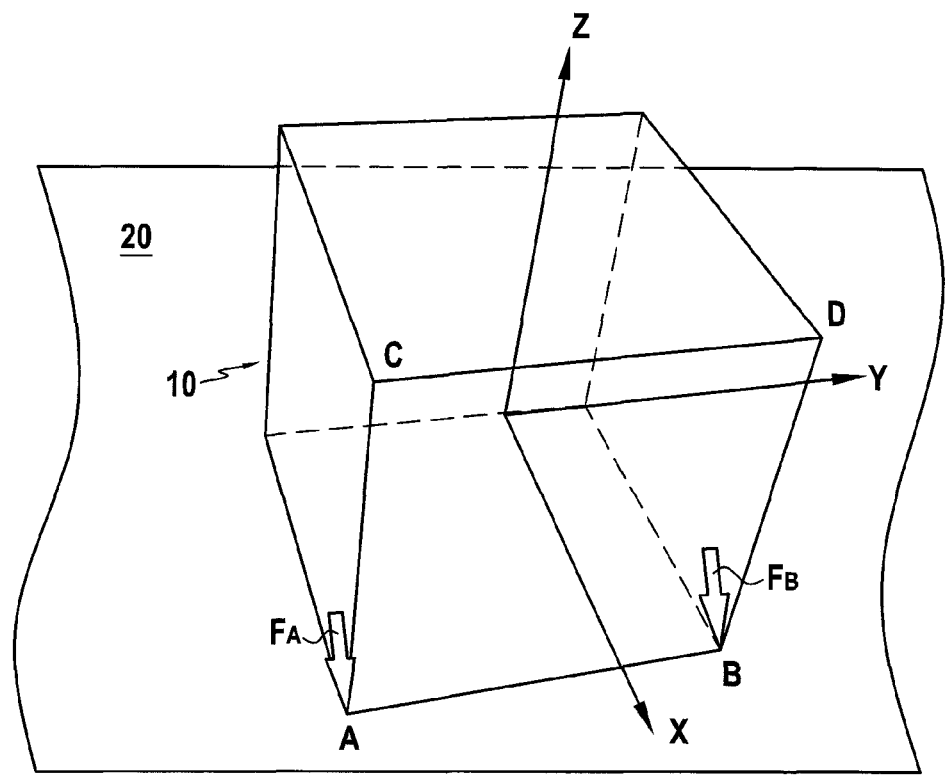
Figure 6:
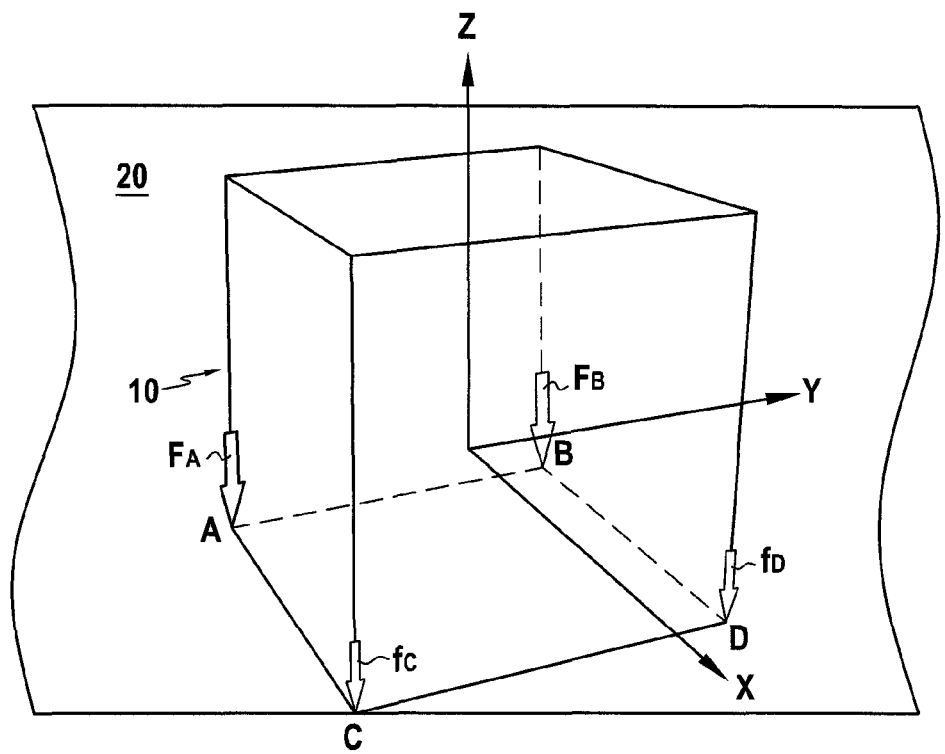
Figure 7:
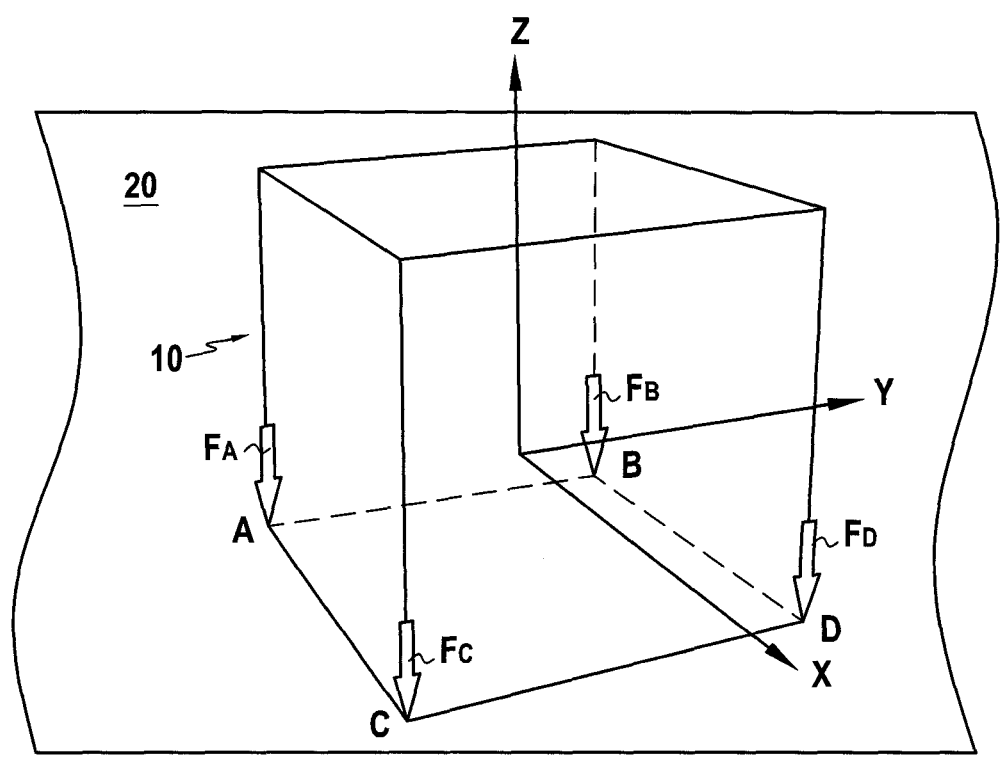

When a corner A of the cube 10 moves toward the plane 20 (FIG. 3), the area of contact and/or the closest contact situated in the corner A of the cube 10 nearest the plane 20 is visualized. In FIG. 3, this is represented by a large arrow $F_A$.

On rotation of the cube 10 (FIG. 4), another corner B moves toward the surface of the plane 20. This is represented by a small arrow $F_B$.

There follows an intermediate step (FIG. 5) in which an edge (or where appropriate a face) of the cube 10 is parallel to the plane 20. Accordingly, in FIG. 5, all the points of the edge situated between the corners A and B are at the same distance relative to the plane 20. This is represented by the large arrows $F_A$, $F_B$ at the corners A and B. The system then visualizes the entire edge (or face) of the cube 10 that is parallel to the plane 20.

If the cube 10 continues to rotate (FIG. 6), a situation arises that is symmetrical to the starting situation, for example the corners C and D of the cube 10 move toward the plane 20 whereas the corners A and B remain at a certain distance from the plane 20. The small arrows $f_c$ and $f_d$ represent the movement of the corners C and D toward the plane 20. In the present example, at the end of this rotation (FIG. 7), the face of the cube 10 delimited by the corners A, B, C, D is parallel to the plane 20. This distance is represented by large arrows $F_A$, $F_B$, $F_C$, $F_D$ at the corners A, B, C, D.

In the prior art, there would have been a discontinuous passage from one corner of the cube to the other, with high instability as a function of a small angular variation of the cube.

In contrast, according to the invention, there is a continuous passage from a point A of the cube 10 to the edge AB, then to the other corner B, then to a face A, B, C, D, in a manner that is not only continuous but also regularized vis-à-vis small angular rotations of the object and vis-à-vis small translations.

This example illustrates the effectiveness of the solution of the invention. In the situation of contact between a concave object and another object, prior art solutions have instabilities that are reflected, for example, in oscillation between different points of contact (as for an inclined stool whose point of contact passes from one leg to the other, or of a cube on a plane). In contrast, according to the invention, the areas of proximity are identified before and/or after a contact, which eliminates instabilities linked to the limited detection of point contacts.

Figure 8:
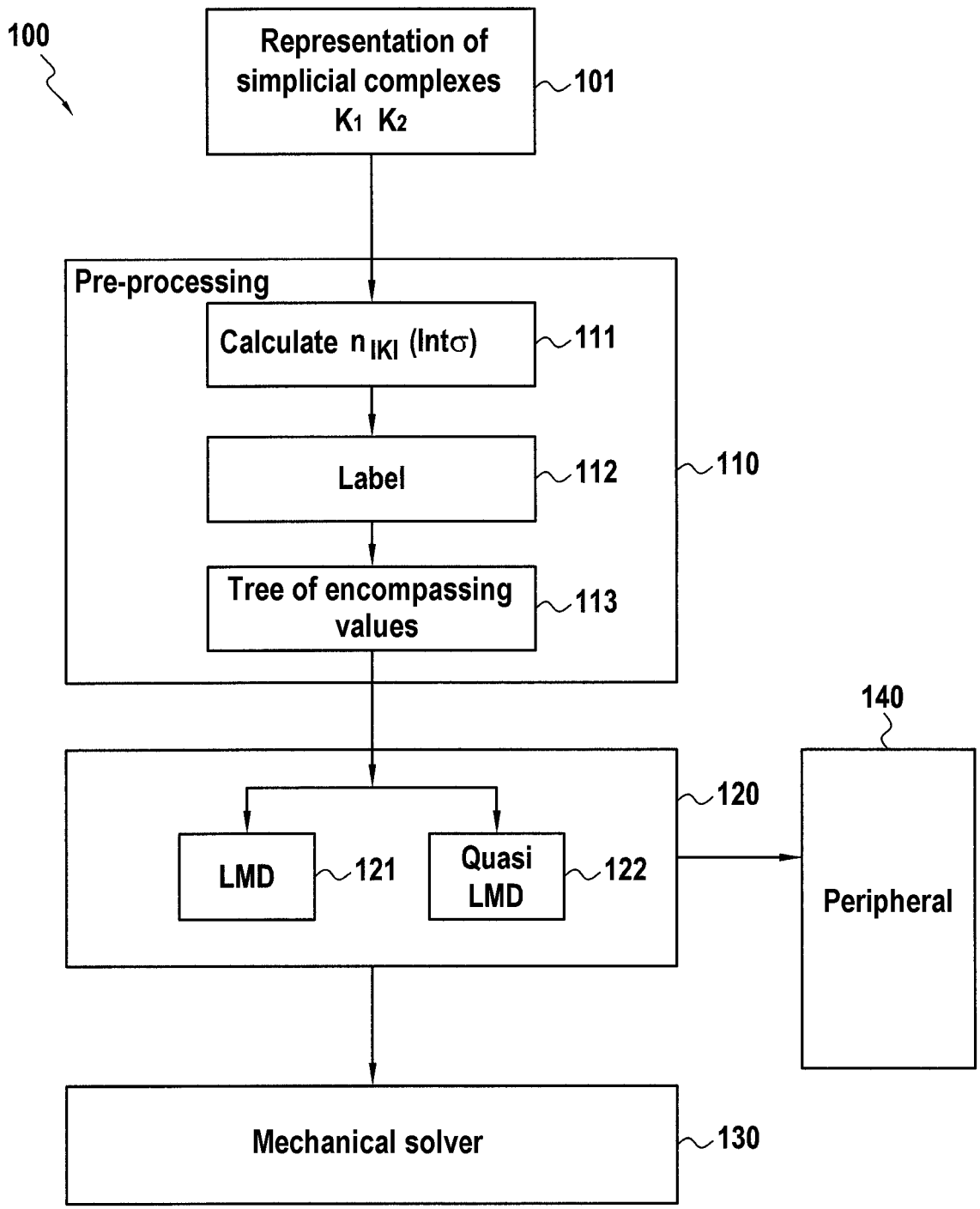
FIG. 8 is a block diagram of an example of a system of the invention.

FIG. 8 represents an example of a system 100 implementing the method of the invention.

The system includes a module 101 for representing in numerical form objects that can be defined in the form of simplicial complexes $K_1$, $K_2$ in $R^n$ where n is equal to 2 or 3.

The system 100 for detecting collision and for constructing geometrical information about proximity and contact between a finite number of virtual objects includes a pre-processor module 110 and a processor module 120.

The pre-processor module 110 for each simplicial complex K, the coordinates of the vertices of which are given in a fixed system of coordinates, includes calculation means 111 for each face 6 for each simplicial complex K, a geometrical description of the polyhedral cone corresponding to the normals in the strong sense $n_{|K|}$ (Int σ) associated with that face, means 112 for determining the label of the contact class to which this face (σ) belongs, and means 113 for determining for each simplicial complex K of a tree of volumes encompassing the object of the simplicial complex K from both the position of the faces σ of the simplicial complex K and from the sets of associated normals in the strong sense $n_{|K|}$ (Int σ).

The processor module 120 includes calculation means utilizing results from the pre-processor module 110 and calculates local minimum distances (LMD) and quasi local minimum distances (quasi-LMD) in the manner explained above.

The combination of the modules 101, 110, 120 is advantageously coupled to a mechanical solver 130.

The combination of the modules 101, 110, 120 and the mechanical solver 130 is preferably coupled to a peripheral 110 consisting of a graphical user interface and/or one or more other peripheral devices 140 such as, for example, a standard 2D mouse, a 3D mouse with six degrees of freedom, a movement capture peripheral, a virtual reality peripheral, a feedback force interface, a touch-sensitive interface, an audio interface.

By evaluating quasi local minimum distances between the virtual objects, the invention constructs a regularized contact space between the objects, the virtual objects modeling rigid or deformable solid bodies defined in a three-dimensional or two-dimensional space.

The problem of detecting collisions between the bodies $C_1$ and $C_2$ can be formulated in a number of ways, each corresponding to a "request type". The request types most frequently encountered are:

interference request: evaluation of the predicate $C_1 \cap C_2 \neq \emptyset$ interference calculation: determination of the compact $C_1 \cap C_2$.

When $C_1$ and $C_2$ are disjoint:

global proximity request or calculation of separation distance (or overall minimum distance): seek the pairs of points (a,b)∈$C_1 \times C_2$ that satisfy $$\min_{(a,b)\in C_1\times C_2} d(a, b)..$$

overall proximity request or calculation of local minimum distances: seek all local minima of the function:

$$d_{C_1 C_2} : \begin{vmatrix} C_1 \times C_2 \to R \\ (a, b) \mapsto d(a, b) \end{vmatrix}$$

When $C_1$ and $C_2$ are of topological dimension n and interfering:
  Overall interpenetration depth calculation: seek a minimum norm vector such that the image of $C_1$ by translation along that vector is disjoint from $C_2$.
  Local interpenetration depth calculation: same calculation, substituting for $C_1$ (respectively $C_2$) the intersection of $C_1$ (respectively $C_2$) with a vicinity of a connex component of $C_1 \cap C_2$.

When $C_1$ and $C_2$ are disjoint:
  Impact time of day calculation: assuming that $C_1$ is in motion relative to $C_2$ along a trajectory with time parameters and assuming that $C_1$ and $C_2$ are initially disjoint, calculate the time of day, if any, of the earliest time at which $C_1$ and $C_2$ begin to interfere.
  Impact point calculation: determine the compact $C_1 \cap C_2$ at the time of day of the impact.

The invention takes account of these various requests and is more particularly concerned with calculating local minimum distances between two sets of elementary primitives:
  in two dimensions, the elementary primitives are the point and the straight-line segment (referred to as an edge);
  in three dimensions, the elementary primitives are the point, the straight-line segment (referred to as an edge) and the triangle.

If the target application is the construction of a contact space between rigid or deformable solids geometrically represented by such sets, the invention also takes into account problems of:
  regularizing the contact space constructed from the local minimum distances;
  minimizing the dimension of this space for sliding contacts between rigid bodies.

If the contact space is not regularized and a time-stepping method is used to solve the contact problem, then instabilities may occur, especially with conforming contact. The present invention solves this problem and processes conforming contact.

If the model of contact between bodies is sliding and the bodies are rigid, the dimension of the contact space can be reduced without changing the contact problem.

The method of the invention improves on the prior art in various areas.
In particular:
  the field of valuation of the field of normals on each elementary primitive is calculated in a well-defined and rigorous manner;
  the primitives considered throughout the method are points, edges (minus their ends), and triangles (minus their vertices), a leaf encompassing volume containing only one primitive;
  the tree of encompassing volumes is constructed from the top down, by successive division, on the basis not only of the position of the primitives but also their orientation;
  the encompassing volumes in the sense of the orientation are single or double circular section cones;
  the situations processed include that of polyhedral surfaces with three edges in three dimensions and that of polygonal curves in two dimensions;
  in three dimensions, volumes represented by their polyhedral envelope can also be processed and likewise, in two dimensions, areas represented by their polygonal contour;
  substituting for the condition of intersection of the primal and dual cones a proximity condition depending on the type of field, the contact spaces constructed from the local minimum distances are regularized vis-à-vis rotations; they are then replaced by quasi local minimum distances relative to the rotations; this concept of regularization is the analog of the regularization that produces the local minimum distances of strict contacts vis-à-vis translations;
  rigid bodies in sliding contact: retaining only the quasi local minimum distances that rely on relatively strictly convex pairs of primitives, the dimension of the regularized contact spaces based on the quasi local minimum distances is reduced by classifying the elementary primitives according to their nature and the topological dimension of their valuation field; a compatibility condition is established between classes of primitives; the information as to presence in a node of the tree of primitives of each class is calculated and a compatibility test is added to the tests of proximity between nodes on descending the trees.

REFERENCE DOCUMENTS

[1] D. Johnson and E. Cohen. Spatialized Normal Cone Hierarchies. In Proc. 2001 ACM Symposium on Interactive 3D Graphics, Research Triangle Park, N.C., Mar. 19-21, 2001. pp. 129-134.
[2] J. R. Munkres. Elements of Algebraic Topology, Advanced Book Program, Perseus Publishing, Cambridge, Mass., 1984.
[3] D. P. Bertsekas. Convex Analysis and Optimization, Athena Scientific, Belmont, Mass., 2003.
[4] E. Larsen, S. Gottschalk, M. Lin, and D. Manocha. Fast Proximity Queries with Swept Sphere Volumes, Technical report TR99-018, Department of Computer Science, University of N. Carolina, Chapel Hill.
[6] C. Ericson. Real Time Collision Detection. Elsevier, MK Press, 2005.
[7] Nina Amenta, Sunghee Choi and Ravi Kolluri The Power Crust Sixth ACM Symposium on Solid Modeling and Applications 2001, pages 249-260.
[8] Nina Amenta, Sunghee Choi and Ravi Kolluri The Power Crust, unions of balls, and the medial axis transform Computation Geometry Theory and Applications, 2001, 19(2-3), pages 127-153, (special issue on surface reconstruction).
[9] G. Zachmann; Process and device for collision detection of objects. U.S. Pat. No. 6,862,026 B2, Mar. 1, 2005.

What is claimed is:
1. A method of detecting collision between at least one first numerically-simulated polyhedral object and at least one second numerically-simulated polyhedral object and of constructing geometrical information about proximity and contact between them;
  the method being characterized in that the first and second numerically-simulated polyhedral objects are represented in the form of non-interfering simplicial com- plexes ($K_1$, $K_2$) in $R''$, where $R''$ designates the Cartesian product of the body of real numbers multiplied by itself n times, with n equal to 2 or 3;

wherein a pre-processing step is carried out for each simplicial complex (K) for which the coordinates of the vertices are given in a fixed system of coordinates;

wherein the pre-processing step consists at least in calculating for each face ($\sigma$) of each simplicial complex (K) a geometrical description of the polyhedral cone corresponding to normals in the strong sense (n|K| (Int$\sigma$)) associated with that face ($\sigma$), determining a label of a contact class to which that face ($\sigma$) belongs, and determining for each simplicial complex (K) a tree of encompassing volumes of the object of the simplicial complex (K) from positions of the faces ($\sigma$) of the simplicial complex (K) and the sets of associated normals in the strong sense (n|K| ($\sigma$)); and wherein, from information obtained after the pre-processing step, a step of calculating local minimum distances (LMD) and quasi local minimum distances (quasi-LMD) is carried out, an LMD being defined by a pair of points producing a local minimum of a restriction of a distance function to the Cartesian product of said simplicial complexes ($K_1$, $K_2$) and by a positive real number d(a,b) characterizing the LMD, each quasi local minimum distance corresponding to a pair of points belonging to respective distinct objects that would define a local minimum distance (LMD) if the position of one object relative to the other were subject to a rotation by a small angle ($\gamma$max) below a given threshold.

2. A method according to claim 1, characterized in that at least one numerically-simulated polyhedral object is rigid.

3. A method according to claim 1, characterized in that at least one numerically-simulated polyhedral object is deformable.

4. A computer implemented system for detecting collision between at least one first numerically-simulated polyhedral object and at least one second numerically-simulated polyhedral object and for constructing geometrical information about proximity and contact between them, the system comprising:

a processor that is operative to execute instructions to provide:

means for representing the first and second numerically-simulated polyhedral objects in the form of non-interfering simplicial complexes (K1, K2) in Rn, where Rn designates the Cartesian product of the body of real numbers multiplied by itself n times, with n equal to 2 or 3;

pre-processing means for each simplicial complex (K) for which the coordinates of the vertices are given in a fixed system of coordinates;

the pre-processing means comprise at least means for calculating for each face ($\sigma$) of each simplicial complex (K) a geometrical description of the polyhedral cone corresponding to normals in the strong sense (n|K| (Int $\sigma$)) associated with that face ($\sigma$), means for determining a label of a contact class to which that face ($\sigma$) belongs, and means for determining for each simplicial complex (K) a tree of encompassing volumes of the object of the simplicial complex (K) from positions of the faces ($\sigma$) of the simplicial complex (K) and the sets of associated normals in the strong sense (n|K| ($\sigma$));

calculation means associated with the pre-processing means for calculating local minimum distances (LMD) and quasi local minimum distances (quasi-LMD), an LMD being defined by a pair of points producing a local minimum of a restriction of a distance function to the Cartesian product of said simplicial complexes ($K_1$, $K_2$) and by a positive real number d(a,b) characterizing the LMD each quasi local minimum distance corresponding to a pair of points belonging to respective distinct objects that would define a local minimum distance (LMD) if the position of one object relative to the other were subject to a rotation by a small angle ($\gamma$max) below a given threshold; and the system being coupled to at least one peripheral selected from the group comprising a graphical user interface, a mouse, a movement capture peripheral, a force feedback interface, a touch-sensitive interface, and an audio interface.

5. A method of detecting collision between at least one first numerically-simulated polyhedral object and at least one second numerically-simulated polyhedral object and of constructing geometrical information about proximity and contact between them;

the method being characterized in that the first and second numerically-simulated polyhedral objects are represented in the form of non-interfering simplicial complexes (K1, K2) in Rn, where Rn designates the Cartesian product of the body of real numbers multiplied by itself n times, with n equal to 2 or 3;

wherein a pre-processing step is carried out for each simplicial complex (K) for which the coordinates of the vertices are given in a fixed system of coordinates;

wherein the pre-processing step consists at least in calculating for each face ($\sigma$) of each simplicial complex (K) a geometrical description of the polyhedral cone corresponding to normals in the strong sense (n|K| (Int $\sigma$)) associated with that face ($\sigma$), determining a label of a contact class to which that face (a) belongs, and determining for each simplicial complex (K) a tree of encompassing volumes of the object of the simplicial complex (K) from positions of the faces ($\sigma$) of the simplicial complex (K) and the sets of associated normals in the strong sense (n|K| ($\sigma$)); and wherein, from information obtained after the pre-processing step, a step of calculating local minimum distances (LMD) and quasi local minimum distances (quasi-LMD) is carried out, an LMD being defined by a pair of points producing a local minimum of a restriction of a distance function to the Cartesian product of said simplicial complexes ($K_1$, $K_2$) and by a positive real number d(a,b) characterizing the LMD, each quasi local minimum distance corresponding to a pair of points belonging to respective distinct objects that would define a local minimum distance (LMD) if the position of one object relative to the other were subject to a rotation by a small angle ($\gamma$max) below a given threshold;

said calculating step operation is associated with one or more of a mechanical solver or a peripheral device selected from the group consisting of a graphical user interface, a mouse, a movement capture peripheral, a force feedback interface, a touch-sensitive interface, and an audio interface.

* * * * *